US008736554B2

(12) United States Patent
Tanzawa

(10) Patent No.: US 8,736,554 B2
(45) Date of Patent: *May 27, 2014

(54) VIDEO GAME PROCESSING APPARATUS AND VIDEO GAME PROCESSING PROGRAM

(71) Applicant: Kabushiki Kaisha Square Enix, Tokyo (JP)

(72) Inventor: Yuichi Tanzawa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,331

(22) Filed: Sep. 13, 2013

(65) Prior Publication Data

US 2014/0018174 A1 Jan. 16, 2014

Related U.S. Application Data

(63) Continuation of application No. 13/494,296, filed on Jun. 12, 2012, now Pat. No. 8,558,797.

(30) Foreign Application Priority Data

Jun. 15, 2011 (JP) ................................. 2011-133738

(51) Int. Cl.
G06F 3/02 (2006.01)
A63F 13/00 (2006.01)
(52) U.S. Cl.
USPC .............. 345/169; 345/173; 345/473; 463/37
(58) Field of Classification Search
USPC ...................... 345/169, 173, 184, 473; 463/37
See application file for complete search history.

(56) References Cited

U.S. PATENT DOCUMENTS 7,456,823 B2    11/2008  Poupyrev et al.
7,730,401 B2     6/2010  Gillespie et al.
(Continued)

FOREIGN PATENT DOCUMENTS

JP    2011-019540    2/2011
JP    2011-036425    2/2011
WO    2011/018869    2/2011

OTHER PUBLICATIONS

David Hinkle, Taito reveals Space Invaders, Cooking Mama games for iPhone, iPod, Android, Feb. 27, 2009, http://www.joystiq.com/2009/02/27/space-invaders-and-cooking-mama-come-to-iphone-ipod-touch-3g/.

(Continued)

Primary Examiner — Dmitry Suhol
Assistant Examiner — Jason Yen
(74) Attorney, Agent, or Firm — Greenblum & Bernstein, P.L.C.

(57) ABSTRACT

A video game processing apparatus for controlling progress of a video game by displaying an object on a display screen of a display device is provided. The video game processing apparatus includes a plurality of touch panels respectively provided on a plurality of surfaces of all of surfaces on a housing of the video game processing apparatus. The video game processing apparatus receives a touch operation for any one of the plurality of touch panels, and determines which surface of the housing contains the touch panel for which the touch operation is received. The video game processing apparatus carries out a predetermined representation against the object displayed on the display screen from a side of the determined surface. The predetermined representation includes a representation indicating an attack against the object from the side of the determined surface.

15 Claims, 5 Drawing Sheets

(56) References Cited

U.S. PATENT DOCUMENTS

| | | |
|---|---|---|
| 8,231,466 B2 | 7/2012 | Tokita et al. |
| 2002/0191029 A1 | 12/2002 | Gillespie et al. |
| 2004/0008191 A1* | 1/2004 | Poupyrev et al. .............. 345/184 |
| 2005/0024341 A1 | 2/2005 | Gillespie et al. |
| 2005/0159217 A1 | 7/2005 | Tawara |
| 2006/0197750 A1* | 9/2006 | Kerr et al. .................... 345/173 |
| 2007/0211035 A1* | 9/2007 | Marcus et al. ................ 345/169 |
| 2007/0236460 A1* | 10/2007 | Young et al. .................. 345/169 |
| 2010/0138680 A1 | 6/2010 | Brisebois et al. |
| 2010/0164959 A1* | 7/2010 | Brown et al. .................. 345/473 |
| 2010/0214250 A1 | 8/2010 | Gillespie et al. |
| 2010/0275033 A1 | 10/2010 | Gillespie et al. |
| 2010/0275163 A1 | 10/2010 | Gillespie et al. |
| 2011/0172013 A1 | 7/2011 | Shirasaka et al. |
| 2011/0291943 A1* | 12/2011 | Thórn et al. .................. 345/173 |
| 2012/0212429 A1 | 8/2012 | Okura et al. |
| 2012/0231884 A1* | 9/2012 | Sakai .............................. 463/31 |

OTHER PUBLICATIONS

Extended European Search Report from the European Patent Office (EPO) in European Patent Application No. 12171659.1, dated Sep. 20, 2012.

\* cited by examiner

Fig. 4

OPERATION INFORMATION

| TOUCH PANEL POSITION | OPERATIONAL CONTENT | REPRESENTATION | ... |
|---|---|---|---|
| FRONT SURFACE | TAP | ATTACK AGAINST ENEMY CHARACTER FROM FRONT SIDE | ... |
|  | ⋮ | ⋮ | ⋮ |
| BACK SURFACE | TAP | ATTACK AGAINST ENEMY CHARACTER FROM BACK SIDE | ... |
|  | TAP WITH SPECIFIC RHYTHM | ATTACK INSTRUCTION TO FRIEND CHARACTER, AND ENCOURAGEMENT | ... |
|  | DRAG | SPECIFICATION OF ATTACK TARGET | ... |
|  | STROKE | RECOVERY OF FRIEND CHARACTER | ... |
|  | DRAG (L SHAPE) | CHANGE STRATEGY IN ACCORDANCE WITH TRACK OF DRAG | ... |
|  | DRAG (STAR SHAPE) | CHANGE STRATEGY IN ACCORDANCE WITH TRACK OF DRAG | ... |
|  | ⋮ | ⋮ | ⋮ |
| RIGHT SIDE SURFACE | TAP | ATTACK AGAINST ENEMY CHARACTER FROM RIGHT SIDE | ... |
|  | ⋮ | ⋮ | ⋮ |
| LEFT SIDE SURFACE | TAP | ATTACK AGAINST ENEMY CHARACTER FROM LEFT SIDE | ... |
|  | ⋮ | ⋮ | ⋮ |
| UPPER SURFACE (UPPER LEFT AND UPPER RIGHT) | TAP | ATTACK AGAINST ENEMY CHARACTER FROM UPPER SIDE | ... |
|  | ⋮ | ⋮ | ⋮ |
| ⋮ | ⋮ | ⋮ | ⋮ |

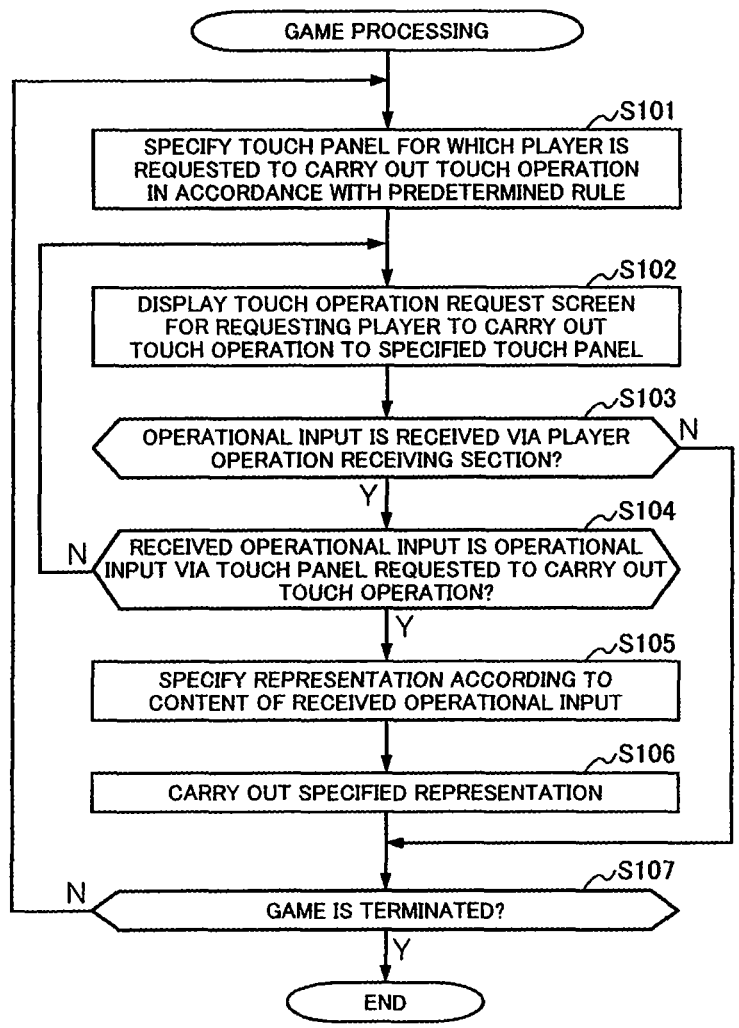

VIDEO GAME PROCESSING APPARATUS AND VIDEO GAME PROCESSING PROGRAM

CROSS REFERENCE TO RELATED APPLICATIONS

This is a continuation application of U.S. patent application Ser. No. 13/494,296, filed on Jun. 12, 2012, the disclosure of which, including the specification, drawings, and claims, is incorporated herein by reference in its entirety.

The present disclosure relates to subject matter contained in Japanese Patent Application No. 2011-133738, filed on Jun. 15, 2011, the disclosure of which is expressly incorporated herein by reference in its entirety.

BACKGROUND OF THE INVENTION

1. Field of the Invention

The present invention relates to technique to control progress of a video game by displaying an object on a display screen of a display device.

2. Description of the Related Art

Heretofore, various kinds of video games including a video game called an RPG (role-playing game: a game in which a player plays a role of a character in a world of the video game, and accomplishes a predetermined object while enjoying a process that the character grows through various experiences) and a simulation game have been provided.

As a video game processing apparatus for carrying out such a video game, one provided with a touch panel is utilized currently. For example, one video game processing apparatus is configured so as to: display a selection button on a display screen provided with a touch panel; carry out a predetermined event process; and change a display form of the displayed selection button in accordance with progress of the video game (see, for example, Japanese Patent Application Publication No. 2011-019540, which is referred to as "Patent Literature 1").

However, in the conventional video game processing apparatus, the touch panel is arranged in the display screen provided for displaying a game screen. For this reason, there has been a problem that a player cannot view apart of the game screen when a touch operation is to be carried out. Namely, since the player is reqested to touch the display screen with his or her finger in order to carry out the touch operation, the player cannot thus view a part of the game screen when the touch operation is to be carried out.

Further, heretofore, a touch panel is provided only in a display screen that is arranged at a position facing the player when the player holds the video game processing apparatus (that is, a front surface). For this reason, a designer of a video game is required to design the video game so that a player can carry out an operational input comfortably in accordance with a position of such a touch panel. Thus, there has been a problem that a video game intuitively operable by a player cannot be provided in some circumstances.

SUMMARY OF THE INVENTION

The present invention has been made in order to solve the problems described above, and it is an object of the present invention to improve operability of a video game using a touch panel.

In order to achieve the above object, in one aspect of the present invention, the present invention is directed to a video game processing apparatus for controlling progress of a video game by displaying an object on a display screen of a display device.

The video game processing apparatus according to the present invention includes a plurality of touch panels respectively provided on a plurality of surfaces of all of surfaces on a housing of the video game processing apparatus.

The video game processing apparatus also includes a touch operation receiver for receiving a touch operation for each of the plurality of touch panels.

The video game processing apparatus also includes a touch surface determiner for determining which surface of the housing contains the touch panel for which the touch operation receiver receives the touch operation.

The video game processing apparatus also includes a representation executor for carrying out a predetermined representation against the object displayed on the display screen from a side of the surface determined by the touch surface determiner on the display screen.

By configuring the video game processing apparatus as described above, it is possible to improve operability of a video game using a touch panel.

In the video game processing apparatus according to the present invention, it is preferable that the video game processing apparatus further includes: a touch operation requester for requesting a player to carry out a touch operation to any one touch panel of the plurality of touch panels; and a correspondence determiner for determining whether the surface in which the touch panel for which the touch operation is requested by the touch operation requester is provided corresponds with the surface determined by the touch surface determiner or not, wherein the representation executor carries out the predetermined representation in a case where the correspondence determiner determines that the surfaces correspond with each other.

In the video game processing apparatus according to the present invention, it is preferable that the predetermined representation includes a representation indicating an attack against the object from the side of the surface determined by the touch surface determiner on the display screen.

In the video game processing apparatus according to the present invention, it is preferable that the touch panels are provided in at least two surfaces of a front surface, a back surface, a right side surface, a left side surface, an upper surface and a lower surface of the housing.

Further, in another aspect of the present invention, the present invention is directed to a video game processing program product for causing a video game processing apparatus to control an operation of the video game processing apparatus. In this case, the video game processing apparatus controls progress of a video game by displaying an object on a display screen of a display device. The video game processing program product according to the present invention causes the video game processing apparatus to execute steps including receiving a touch operation for a plurality of touch panels, the plurality of touch panels being respectively provided on a plurality of surfaces of all of surfaces of a housing of the video game processing apparatus.

The steps also include determining which surface of the housing contains the touch panel for which the touch operation is received in the receiving the touch operation.

The steps also include carrying out a predetermined representation against the object displayed on the display screen from a side of the surface determined in the determining which surface of the housing on the display screen.

According to the present invention, it is possible to improve operability of a video game using a touch panel.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 4 is an explanatory drawing showing an example of a storage state of operation information;

FIG. 5 is a flowchart showing an example of game processing;

DETAILED DESCRIPTION OF THE INVENTION

Hereinafter, one embodiment of the present invention will be described with reference to the appending drawings.

Figure 1:
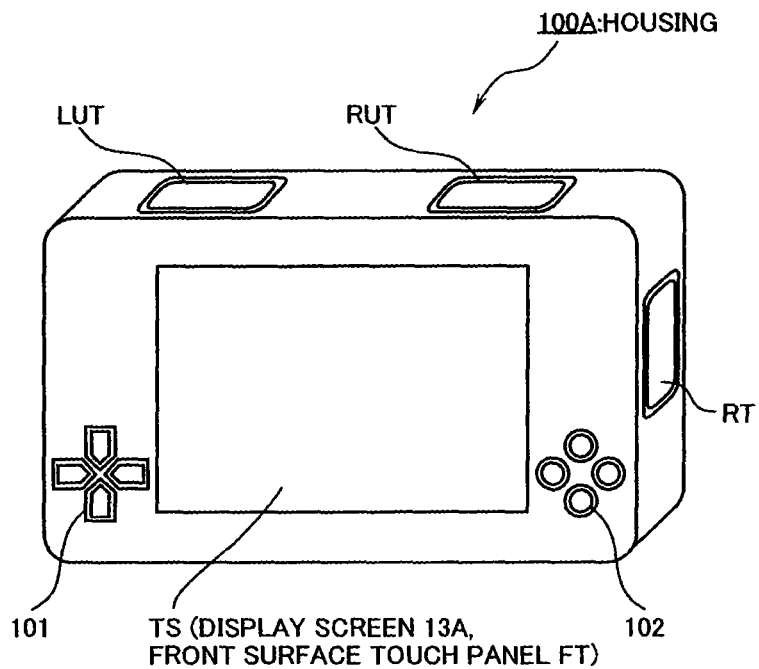
FIG. 1 is a perspective view of a front surface side showing an example of a configuration of a housing of a video game processing apparatus.
Figure 2:
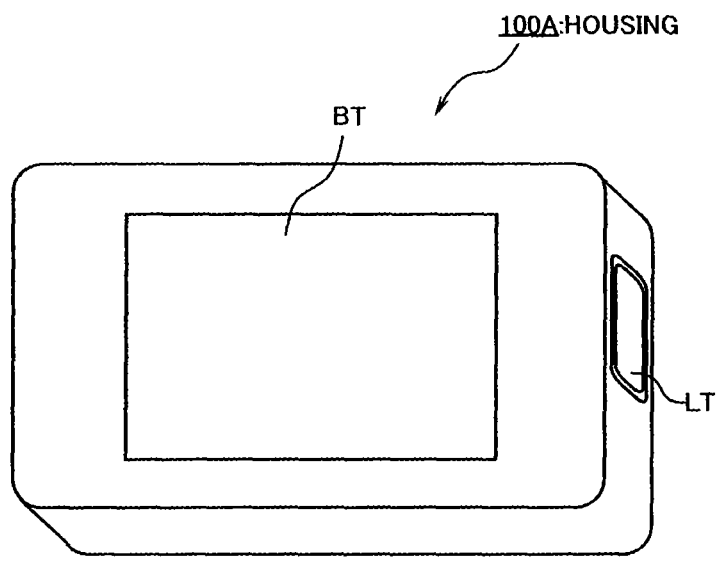
FIG. 2 is a perspective view of a back surface side showing an example of the configuration of the housing of the video game processing apparatus.

FIGS. 1 and 2 are explanatory drawings showing an example of a configuration of a housing 100A of a video game processing apparatus 100 according to one embodiment of the present invention. As shown in FIGS. 1 and 2, in the video game processing apparatus 100, touch panels are respectively provided on a front surface, an upper surface, a right side surface, a back surface and a left side surface of surfaces of the housing 100A of the video game processing apparatus 100. Further, in the present embodiment, the case where two touch panels are provided on the upper surface of the housing 100A will be described. Hereinafter, touch panels provided on the respective surfaces are referred to as a front surface touch panel FT, an upper surface touch panel UT (including an upper left surface touch panel LUT and an upper right surface touch panel RUT), a right side surface touch panel RT, a back surface touch panel BT, and a left side surface touch panel LT.

Further, in the present embodiment, the case where only the front surface touch panel FT is provided in the display section 13 (more specifically, a display screen 13A of the display section 13) for displaying a game screen will be described. However, the video game processing apparatus 100 maybe configured so that touch panels are respectively provided in display devices (or display sections) for other surfaces of the housing 100A, which are used for displaying various kinds of screens. Namely, for example, the housing 100A of the video game processing apparatus 100 may be configured so as to include touch screens TS each of which is constructed by a display device and a touch panel on the respective surfaces.

Figure 3:
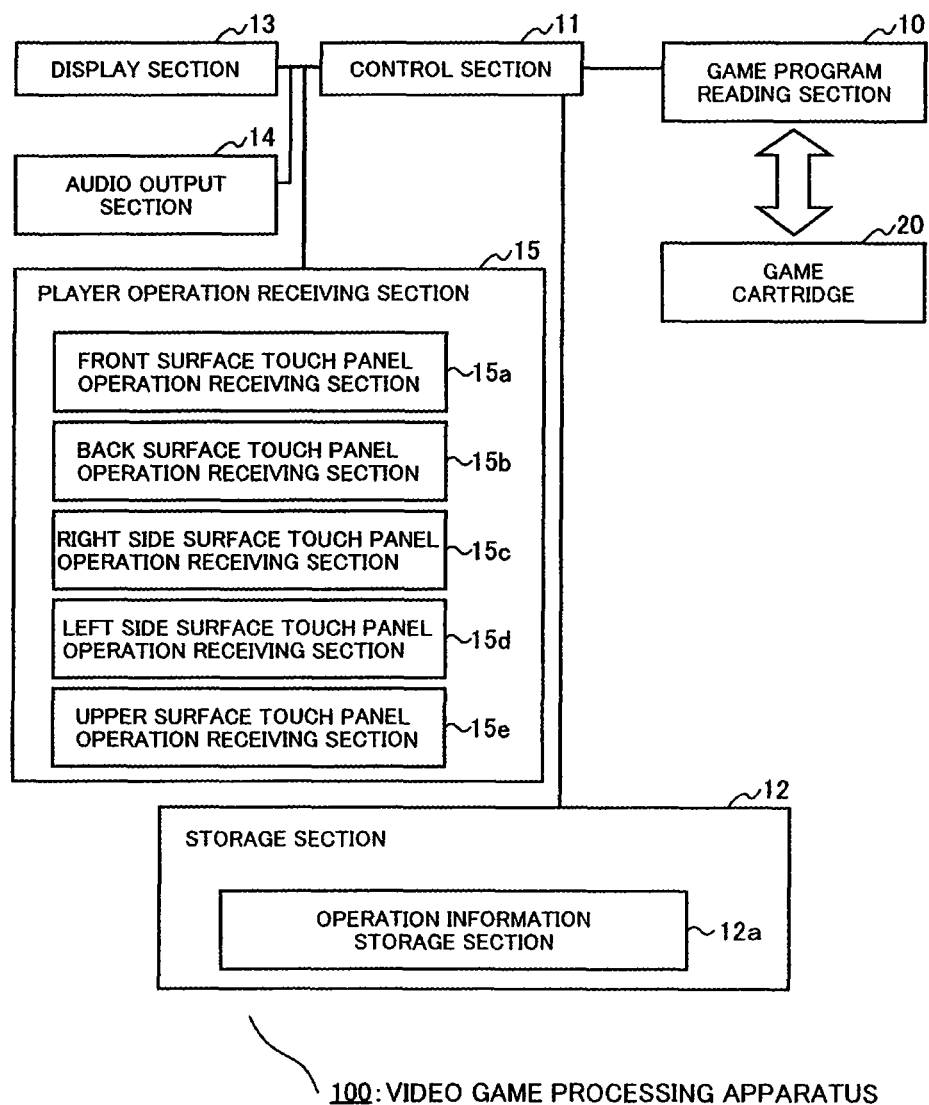
FIG. 3 is a block diagram showing a configuration example of the video game processing apparatus.

FIG. 3 is a block diagram showing a configuration example of the video game processing apparatus 100. As shown in FIG. 3, the video game processing apparatus 100 includes a game program reading section 10, a control section 11, a storage section 12, a display section 13, an audio outputting section 14, and a player operation receiving section 15.

The game program reading section 10 has a function to read out a necessary video game program from a storage medium in which various kinds of video game programs are stored. In this regard, in the present embodiment, the game program reading section 10 has a mounting section for mounting therein a detachable game cartridge 20 in which a video game program is stored; reads out the video game program from the storage medium of the game cartridge 20 mounted in the mounting section by a player (that is, an operator of the video game processing apparatus 100); and stores the read-out video game program in the storage section 12. In this regard, a video game carried out in accordance with the video game program used in the present embodiment may be any one such as RPGs, simulation games, puzzle games, battle games and the like so long as the video game is a video game in which a touch panel can be utilized.

The control section 11 has a function to execute the video game program read out from the game program reading section 10 and stored in the storage section 12, and a function to carry out various kinds of controls for causing the video game to proceed in response to an operation of the player.

Further, in particular, the control section 11 has a function to carry out: a touch operation receiving process to receive a touch operation for each of the plurality of touch panels respectively provided in the plurality of surfaces of all of surfaces of the housing 100A of the video game processing apparatus 100; a touch surface determining process to determine which surface of the housing 100A includes the touch panel for which the touch operation is received in the touch operation receiving process; and a representation executing process to carry out a predetermined representation against an object (for example, an enemy character NPC) displayed on the display screen 13A from a side of the surface determined in the touch surface determining process on the display screen 13A.

The storage section 12 is a storage medium for storing video game programs necessary when the video game is caused to proceed and various kinds of data. The storage section 12 is configured by a nonvolatile memory such as a RAM, for example. In the storage section 12, various kinds of information registered and updated in accordance with progress of the video game, and various kinds of information used in the video game, which are read out from the storage medium embedded in the game cartridge 20 are stored.

In this regard, the video game processing apparatus 100 maybe configured so as to: download a video game program from a video game program providing server (not shown in the drawings) or the like via a communication network such as the Internet; and store the downloaded video game program in the storage section 12.

In the present embodiment, the storage section 12 includes an operation information storage section 12a in which information indicating plural kinds of representations (for example, an attack against a character, and the like) carried out in response to an operational input received by the player operation receiving section 15 is stored.

FIG. 4 is an explanatory drawing showing an example of a storage state of operation information stored in the operation information storage section 12a. As shown in FIG. 4, the operation information is information in which a position of a touch panel, the operation content and the content of representation are associated with each other. As the operation content, for example, as shown in FIG. 4, the content of each of various kinds of operations that the control section 11 can distinguish, such as a tap with a specific rhythm, a drag so as to draw a specific track and the like, is contained in addition to the content of basic operation to a touch panel such as a tap (tap operation), a drag (drag operation) and the like. In this regard, in the present embodiment, an operation to drag substantially the same position on the touch panel multiple times continuously is called a "stroke". Further, as the content of a representation, for example, as shown in FIG. 4, an attack from a predetermined direction, an attack instruction to a friend character, encouragement to a friend character, recovery of the friend character and the like are thought. Otherwise, as the content of the representation, a stroke action to a character such as a pet from a predetermined direction and the like are also thought. In this regard, plural kinds of operation information are stored in accordance with a status of the video game displayed on the display screen of the display section 13. Namely, even though the same operational input is received, a representation to be carried out in a battle scene against an enemy character is different from a representation to be carried out in a conversation scene with a friend character, for example.

The display section 13 is a display device for displaying the game screen in response to an operation by the player in accordance with a control of the control section 11. The display section 13 is constructed by a liquid crystal display, for example.

The audio outputting section 14 has a function to output audio in response to an operation of the player and an action of a character in accordance with s control by the control section 11.

The player operation receiving section 15 receives an operational signal according to an operation of the player, and notifies that result to the control section 11. In the present embodiment, the player operation receiving section 15 includes, in order to receive an operation of the player via the touch panels provided on the respective surfaces on the housing 100A of the video game processing apparatus 100, a front surface touch panel operation receiving section 15a, a back surface touch panel operation receiving section 15b, a right side surface touch panel operation receiving section 15c, a left side surface touch panel operation receiving section 15d, and an upper surface touch panel operation receiving section 15e. Further, although it is not illustrated in FIG. 3, the player operation receiving section 15 includes a button operation receiving section for receiving an operation of the player via manual operation buttons 101, 102 provided on the housing 100A of the video game processing apparatus 100.

Next, an operation of the video game processing apparatus 100 according to the present embodiment will be described.

FIG. 5 is a flowchart showing an example of game processing carried out by the video game processing apparatus 100. The game processing is started in a case where the control section 11 starts to receive an operational input by a player A when a predetermined condition is satisfied in accordance with progress of the video game. Here, the case where the control section 11 receives an operational input by the player A on a battle scene against an enemy character will be described as an example. In this regard, actions and processing with no relationship to the present invention may be omitted.

In the game processing, the control section 11 first specifies a touch panel for which the player A is requested to carry out a touch operation in accordance with a predetermined rule (Step S101). In this regard, in the present embodiment, the control section 11 acquires information indicating a necessary rule in accordance with progress of the video game (for example, information indicating a predetermined rule for specifying a touch panel for which a touch operation is requested in a battle scene between a player character operated by the player A and an enemy character) via the game program reading section 10 when to start a battle, for example. In this regard, the touch panel for which the touch operation is requested may be specified by selecting a touch panel at random.

When the touch panel for which the touch operation is requested is specified, the control section 11 causes the display section 13 to display a touch operation request screen for requesting the player to carry out a touch operation for the specified touch panel on the display screen 13A (Step S102).

Figure 6:
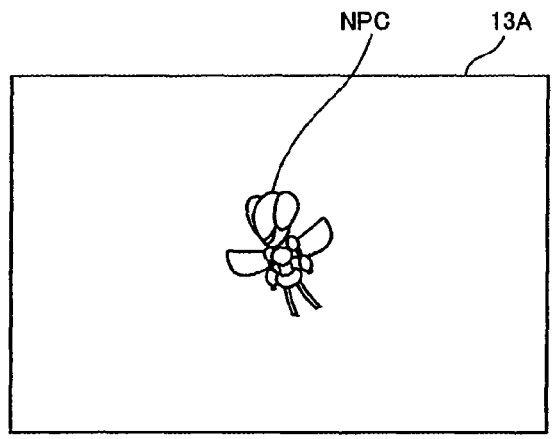
FIG. 6 is an explanatory drawing showing an example of a game screen.

FIG. 6 is an explanatory drawing showing an example of the game screen (touch operation request screen) displayed on the display screen 13A of the display section 13 provided on the housing 100A of the video game processing apparatus 100. As shown in FIG. 6, in the present embodiment, the control section 11 causes the display section 13 to display an enemy character NPC on the display screen 13A, and requests a touch operation for a touch panel positioned outside from a field of view of the enemy character NPC. Namely, since the enemy character NPC looks at the left side in the example shown in FIG. 6, a touch operation for any one of the upper surface touch panel UT, the right side surface touch panel RT and the back surface touch panel BT is requested.

In this regard, the method of requesting the touch operation is not limited to this method, and, for example, the video game processing apparatus 100 may be configured so as to request the player to carry out a touch operation to a specific touch panel expressly using a text object or the like displayed on the display screen 13A. Further, the video game processing apparatus 100 may be configured so as to request the player to carry out a touch operation using an audio output or the like.

When the touch operation request screen is displayed, the control section 11 determines whether an operational input is received by the player operation receiving section 15 or not (Step S103). Here, in a case where it is determined that the operational input is not received ("No" at Step S103), the control section 11 causes the processing flow to shift to a process at Step S107 (will be described later). For example, the control section 11 may wait for reception of the operational input for a predetermined period of time; and determine that no operational input is received in a case where such an operational input has not been received for the predetermined period of time.

On the other hand, in a case where it is determined that the operational input is received ("Yes" at Step S103), the control section 11 determines whether the received operational input is an operational input for the touch panel requested to carry out the touch operation (that is, an operational input for the touch panel for which the player is requested to carry out the touch operation) or not (Step S104). Here, in a case where it is determined that the received operational input is not the operational input for the touch panel requested to carry out the touch operation, for example, by receiving an operational input via the front surface touch panel operation receiving section 15a ("No" at Step S104), the control section 11 causes the processing flow to shift to the process at Step S102. In this case, the video game processing apparatus 100 may be configured so that the control section 11 causes the processing flow to shift to the process at Step S102 after a process to inform the player A that an operation different from the required one (for example, a process to display a predetermined screen on the display screen 13A) has been carried out.

On the other hand, in a case where it is determined that the received operational input is the operational input for the touch panel requested to carry out the touch operation, for example, by receiving an operational input via the right side surface touch panel operation receiving section 15c ("Yes" at Step S104), the control section 11 specifies a representation according to the content of the received operational input (Step S105). In the present embodiment, the control section 11 refers to the operation information storage section 12a, and specifies the representation in accordance with the content of the received operational input.

When the representation according to the content of the received operational input is specified, the control section 11 carries out the specified representation (Step S106).

Figure 7:
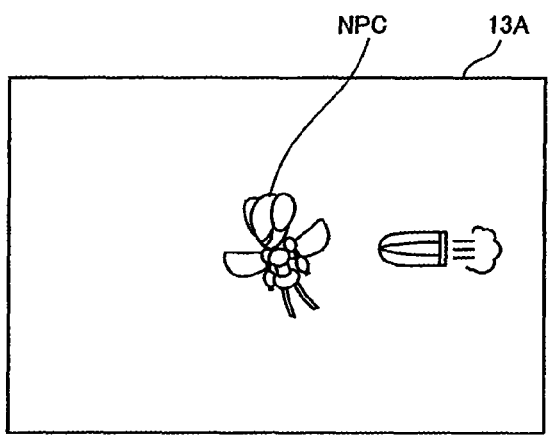
FIG. 7 is an explanatory drawing showing an example of the game screen.

FIG. 7 is an explanatory drawing showing an example of the game screen when the specified representation is carried out. In the game processing, in a case where the player A carries out the tap operation onto the right side surface touch panel RT in accordance with the requested touch operation, the control section 11 carries out a process to carry out a representation to make an attack against the enemy character NPC from the right side (a direction in which the right side surface touch panel RT is arranged).

Figure 8:
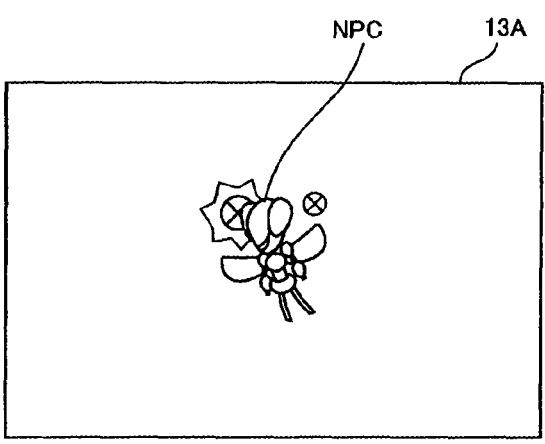
FIG. 8 is an explanatory drawing showing an example of the game screen.

FIG. 8 is an explanatory drawing showing another example of the game screen when the specified representation is carried out. In the game processing, in a case where the player A carries out the tap operation to the back surface touch panel BT in accordance with the requested touch operation, the control section 11 carries out a process for a representation to make an attack against the enemy character NPC from the back surface side (a direction in which the back surface touch panel BT is arranged).

When the specified representation is carried out in accordance with the content of the operational input, the control section 11 determines whether a predetermined video game terminating condition is satisfied or not (Step S107). Here, in a case where it is determined that the predetermined video game terminating condition is not satisfied ("No" at Step S107), the control section 11 causes the processing flow to shift to the process at Step S101.

On the other hand, in a case where it is determined that the predetermined video game terminating condition is satisfied ("Yes" at Step S107), the control section 11 terminates the game processing herein.

In this regard, although the video game processing apparatus 100 is configured so as to request the player to carry out the touch operation for the specific touch panel via the touch operation request screen in the embodiment described above, the video game processing apparatus 100 may be configured so as not to request the player to carry out the touch operation for the specific touch panel. Namely, the video game processing apparatus 100 may be configured so as not to carry out the processes at Steps S101, S102 and S104. In this case, for example, in a case where a touch operation for any touch panel is received in a state that the game screen as shown in FIG. 6 is displayed, the control section 11 may specify and carry out a representation according to the content of the received operational input (for example, the representation as explained with reference to FIG. 7 or FIG. 8).

Further, the video game processing apparatus 100 may be configured so as to request the player to carry out a touch operation for a specific touch panel with respect to only the content of a specific operation. Namely, for example, the video game processing apparatus 100 may be configured so as to: specify the operation content for the touch panel for which the player is requested to carry out a touch operation in accordance with a specific rule before the process at Step S102; and display a touch operation request screen for informing the player of the specified operation content together with the specified touch panel at Step S101. Hereinafter, an operation of the video game processing apparatus 100 in this case will be described with reference to FIG. 5. In this regard, the operation and the processing that have already been explained may be omitted.

In the game processing, the control section 11 first specifies a touch panel for which the player A is requested to carry out a touch operation, for example (Step S101). Hereinafter, the case where the back surface touch panel BT is specified as the touch panel for which the touch operation is requested will be described as an example.

When the back surface touch panel BT is specified as the touch panel requested to carry out the touch operation, the control section 11 specifies the operation content for the back surface touch panel BT, for which the player A is requested to carry out the touch operation, in accordance with the specific rule (not shown in the drawings). Hereinafter, the case where a "tap with a specific rhythm" is specified as the operation content will be described as an example (see FIG. 4).

When the "tap with a specific rhythm" is specified as the operation content that the player A is requested to carry out, the control section 11 displays the touch operation request screen for informing the player A of a position of the specified touch panel and the operation content thereof (Step S102). In the present embodiment, the control section 11 displays a touch operation request screen that includes an image indicating a position of the back surface touch panel BT and a specific rhythm with which the back surface touch panel BT is to be tapped on the display screen 13A, for example, so that the player A can recognize that he or she is requested to "tap the back surface touch panel BT with the specific rhythm". In this regard, in the present embodiment, information on the image displayed at this time (that is, the operation request image information) is stored in a predetermined storage region of the storage section 12 in a state that this information is associated with the operation information thereof.

When the touch operation request screen is displayed, the control section 11 determines whether the player operation receiving section 15 receives an operational input or not (Step S103). In a case where it is determined that the operational input is received ("Yes" at Step S103), the control section 11 determines whether the received operational input is an operational input for the touch panel requested to carry out the touch operation or not (Step S104).

Here, in a case where it is determined that the received operational input is the operational input for the touch panel requested to carry out the touch operation, for example, by receiving the operational input via the back surface touch panel operation receiving section 15b ("Yes" at Step S104), the control section 11 determines whether the content of the received operational input corresponds with the operation content thus requested or not (not shown in the drawings). Here, in a case where it is determined that, for example, the received operational input indicates a drag operation (that is, a drag operation to the back surface touch panel BT by the player A is received), by which the content of the received operational input does not correspond with the operation content thus requested, the control section 11 causes the processing flow to shift to the process at Step S102 (not shown in the drawings).

On the other hand, in a case where it is determined that, for example, the received operational input indicates a "tap with a specific rhythm" (that is, a tap operation onto the back surface touch panel BT according to a specific rhythm by the player A is received), by which the content of the received operational input corresponds with the operation content thus requested, the control section 11 specifies the representation according to the content of the received operational input (that is, a touch panel position and the operation content thereof) (Step S105). In the present embodiment, the control section 11 specifies "an attack instruction to a friend character, and encouragement" as the representation according to the content of the received operational input (see FIG. 4).

When the representation according to the content of the received operational input is specified, the control section 11 carries out the specified representation (Step S106). Although it is not illustrated in the present embodiment, the control section 11 displays a predetermined animation in which the player character operated by the player A encourages a friend character, for example, and, in addition, carries out the representation indicating an attack instruction to the friend character and encouragement to the friend character by changing a setup regarding an action of the friend character. In this regard, in the present embodiment, when the representation that the player character encourages the friend character is carried out, the control section 11 carries out a process to recover physical strength of the encouraged friend character (more specifically, a process to increase a value of an HP).

In this regard, the video game processing apparatus 100 maybe configured so as note to request the player to carry out the touch operation with respect to the operation content. Namely, the video game processing apparatus 100 may be configured so as not to carryout specification of the operation content and display of the touch operation request screen indicating the specified operation content.

As explained above, in the embodiment described above, the video game processing apparatus 100 for controlling progress of the video game by displaying the object (for example, the enemy character NPC) on the display screen of the display device (for example, on the display screen 13A of the display section 13) in accordance with the progress of the video game is configured so as to: include the plurality of touch panels (for example, the front surface touch panel FT, the upper left surface touch panel LUT, the upper right surface touch panel RUT, the right side surface touch panel RT, the back surface touch panel BT, and the left side surface touch panel LT) provided on the plurality of surfaces of all of the surfaces on the housing 100A of the video game processing apparatus 100; receive the touch operation for each of the plurality of touch panels; determine which surface of the housing 100A contains the touch panel for which the touch operation is received; and carry out the predetermined representation (for example, the attack against the enemy character NPC) for the object displayed on the display screen 13A (for example, the enemy character NPC) from the side of the surface for which it is determined that the operation of the touch panel on the display screen 13A is received (for example, from the side of the right surface in a case where it is determined that the operation for the right side surface touch panel RT is received). Therefore, it becomes possible to improve operability of a video game using touch panels.

Namely, since the video game processing apparatus 100 is configured to include the touch panels other than the touch panel (that is, the front surface touch panel FT) provided on the display screen 13A. Therefore, in a case where the video game requests the player to carry out the operation to the touch panel, by requesting the player to carry out the operation to any touch panel other than the front surface touch panel FT, it is possible to prevent the player from hiding the game screen by means of his or her fingers.

Further, the video game processing apparatus 100 is configured so as to: include the plurality of touch panels; and carry out the representation according to the touch surface determined by touch surface determination. Therefore, it is possible to heighten the degree of freedom when to create a video game. Namely, for example, in a case where the player taps a right side surface of the video game processing apparatus 100 (more specifically, the right side surface touch panel RT in the housing 100A of the video game processing apparatus 100), it is possible to make an attack against a character displayed on the display screen from the right side. Thus, it becomes possible to reduce a work burden required to create an intuitively operable video game.

Further, in the embodiment described above, the video game processing apparatus 100 is configures so as to: request the player to carry out the touch operation to any one touch panel (for example, the upper surface touch panel UT, the right side surface touch panel RT, or the back surface touch panel BT) of the plurality of touch panels (for example, the front surface touch panel FT, the upper left surface touch panel LUT, the upper right surface touch panel RUT, the right side surface touch panel RT, the back surface touch panel BT, and the left side surface touch panel LT); determine whether the surface (for example, the upper surface, the right side surface, or the back surface) in which the touch panel requested to carry out the touch operation is provided corresponds with the surface for which it is determined that the operation for the touch panel is received or not; and carry out the predetermined representation (for example, the representation indicated by the operation information) in a case where it is determined that the surface in which the touch panel requested to carryout the touch operation is provided corresponds with the surface for which it is determined that the operation for the touch panel is received. Therefore, it becomes possible to further improve interest of the player in the video game carried out using a plurality of touch panels.

Further, in the embodiment described above, the video game processing apparatus 100 is configured so that the predetermined representation (for example, the representation indicated by the operation information) includes the representation indicating the attack against the object (for example, the enemy character NPC) from the side of the surface for which it is determined that the operation for the touch panel on the display screen 13A is received. Therefore, it becomes possible to provide a video game classified into an RPG or an action game using a plurality of touch panels.

In this regard, in the embodiment described above, the case where the touch panels are respectively provided in the front surface, the back surface, the right side surface, the left side surface and the upper surface of the housing 100A has been explained. However, arrangement of the touch panels is not limited to this method. The touch panels may be provided in at least two surfaces of the front surface, the back surface, the right side surface, the left side surface, the upper surface and the lower surface of the housing 100A. By configuring the video game processing apparatus 100 in this manner, it becomes possible to improve the degree of freedom regarding design of a video game compared with the case of carrying out a video game using a conventional video game processing apparatus using only one touch panel.

In this regard, although it has not been mentioned in the embodiment described above in particular, the video game processing apparatus 100 may be configured so as to be capable of editing the content of operation information (for example, correspondence relationship between the position of the touch panel and the representation) in response to an operation by the player. By configuring the video game processing apparatus 100 in this manner, it becomes possible to provide a video game in which an operation more appropriate for feeling of the player.

In this regard, in the embodiment described above, the case where the video game processing apparatus 100 determines the content of the operation to the touch panel and carries out representation in accordance with the determined operation content has been explained as an example. However, here, another example shown in FIG. 4 of the operation content and representation will be described concretely.

For example, when a drag operation to the back surface touch panel BT is received, the control section 11 specifies a range of the display screen 13A corresponding to the drag operation, and carries out representation indicating that the enemy character displayed within the specified range is specified as an attack target by the player character or a friend character. By configuring the video game processing apparatus 100 in this manner, it is possible to avoid the player A from hiding the display screen 13A by means of his or her fingers, a pointing device or the like in a case where he or she wants to specify one region within the display screen 13A by a touch operation, for example.

Further, when a drag operation to the back surface touch panel BT is received, the control section 11 determines whether the received drag operation indicates a specific shape or not (for example, the control section 11 determines whether or not a track of the drag operation indicates an L shape or a star shape). In a case where it is determined that the track of the drag operation indicates the specific shape, the control section 11 carries out the corresponding representation (for example, a representation in which strategy instructed to the friend character is changed into strategy associated with the track of the drag operation in advance). By configuring the video game processing apparatus 100 in this manner, it becomes possible to provide, to the player, operability different from that in a case where a predetermined shape is drawn on the front surface of the housing 100A. Therefore, it is possible to improve interest of the player in the video game.

Further, when a touch operation to the back surface touch panel BT is received, the control section 11 carries out representation indicating that the character arranged at a position corresponding to the position at which the touch operation is received on the basis of coordinates in a battle field is selected. By configuring the video game processing apparatus 100 in this manner, it is possible to readily select a character or the like that is not displayed on the display screen because the character or the like is positioned at the back of other character.

In this regard, although it has not been mentioned in the embodiment described above in particular, the video game processing apparatus 100 may be configured so as to: determine whether a tap operation to a touch panel is received or not; detect a tap portion on the touch panel in a case where it is determined that the tap operation to the touch panel is received; determine whether the detect tap portion on the touch panel corresponds with a position of an object on the display screen (for example, a display position of the character) or not; and carry out a representation (for example, an attack against a character) corresponding to the received tap in a case where it is determined. Namely, the video game processing apparatus 100 may be configured so as to: detect a tap portion of the back surface touch panel BT and a display position of a character displayed on the display screen 13A; and carry out a representation (for example, an attack instruction to a character displayed at a position corresponding to a tap portion, encouragement, or the like) corresponding to the tap portion of the back surface touch panel BT when the detected portion corresponds to the display position (for example, when the character is displayed in an area corresponding to a back side (a side of the front surface) of the tap portion of the back surface touch panel BT), for example.

In this regard, although it has not been mentioned in the embodiment described above in particular, it is preferable that the housing 100A of the video game processing apparatus 100 is formed so as to be capable of carrying out a touch operation to the upper left surface touch panel LUT and the left side surface touch panel LT using an index finger of a left hand, a touch operation to the upper right surface touch panel RUT and the right side surface touch panel RT using an index finger of a right hand, and a touch operation to the back surface touch panel BT using middle fingers, ring fingers and little fingers when the player holds the housing 100A in both hands.

In this regard, in the embodiment described above, the video game processing apparatus 100 is configured so as to carry out various kinds of processes such as the game processing described above on the basis of the video game program read out from the game cartridge 20. However, the video game processing apparatus 100 may be configured so as to acquire the video game program via the communication network such as the Internet from a game server. Further, the video game processing apparatus 100 maybe configured so as to function as the game server and to provide the video game program to a game terminal via the communication network.

Further, in the embodiment described above, the video game processing apparatus 100 carries out the various kinds of processes described above in accordance with a control program (a video game processing program product (a video game program or it may be called as a "program") stored in a storage device (the storage section 12) with which the video game processing apparatus 100 itself is provided.

The present invention is useful to improve operability of a video game using a touch panel.

What is claimed is:

1. A video game processing apparatus for controlling progress of a video game while displaying an object on a display screen of a display device, the video game processing apparatus comprising:

a plurality of touch panels provided on a plurality of surfaces of a housing of the video game processing apparatus;

a touch operation receiver for receiving a touch operation for each of the plurality of touch panels;

a touch surface determiner for determining which surface of the plurality of surfaces of the housing contains a touch panel of the plurality of touch panels for which the touch operation receiver receives the touch operation; and a representation executor for carrying out a predetermined representation against the object displayed on the display screen from a side of the surface determined by the touch surface determiner to contain the touch panel that receives the touch operation, wherein the representation executor is configured to specify the predetermined representation according to the touch operation received by the touch operation receiver by referring to operation information, in which a position of the touch panel, operation content and content of each of a plurality of predetermined representations are associated with each other, and carry out the specified predetermined representation.

2. The video game processing apparatus according to claim 1, further comprising:

an operation information memory for storing the operation information.

3. The video game processing apparatus according to claim 1, wherein each of the plurality of touch panels is configured to receive a plurality of different touch operations, and the representation executor is configured to carry out the plurality of predetermined representations against the object in accordance with the plurality of different touch operations.

4. The video game processing apparatus according to claim 3, further comprising:
   a touch operation requester for requesting a player to carry out the touch operation to any one touch panel of the plurality of touch panels; and
   a correspondence determiner for determining whether the touch panel for which the touch operation is requested by the touch operation requester is provided corresponds with the surface determined by the touch surface determiner,
   wherein the representation executor carries out the predetermined representation when the correspondence determiner determines that the touch panel for which the touch operation is requested corresponds with the surface determined by the touch surface determiner.

5. The video game processing apparatus according to claim 3, wherein the plurality of predetermined representations includes a representation indicating an attack against the object from the side of the surface determined by the touch surface determiner on the display screen.

6. The video game processing apparatus according to claim 3, wherein the touch panels are provided in at least two surfaces of a front surface, a back surface, a right side surface, a left side surface, an upper surface and a lower surface of the housing.

7. The video game processing apparatus according to claim 3, wherein the plurality of predetermined representations that are to be carried out against the object displayed on the screen in accordance with the plurality of different touch operations is equivalent for each of the plurality of touch panels.

8. The video game processing apparatus according to claim 3, wherein the plurality of predetermined representations that are to be carried out against the object displayed on the screen in accordance with the plurality of different touch operations is different for each of the plurality of touch panels.

9. The video game processing apparatus according to claim 3, wherein the plurality of different touch operations comprise a tap operation and a tap with specific rhythm operation.

10. The video game processing apparatus according to claim 3, wherein the representation executor is configured to carry out a same predetermined representation against the object displayed on the display screen in accordance with a same touch operation being received by each of the plurality of touch panels.

11. The video game processing apparatus according to claim 3, wherein the representation executor is configured to carry out a different predetermined representation against the object displayed on the display screen in accordance with a same touch operation being received by different ones of the plurality of touch panels.

12. The video game processing apparatus according to claim 3, wherein the plurality of predetermined representations is predetermined by the video game for each of the plurality of touch panels.

13. The video game processing apparatus according to claim 3, wherein the plurality of predetermined representations is assignable to each of the plurality of touch panels during a touch operation request process of the video game.

14. A non-transitory computer-readable medium including a video game processing program product for causing a video game processing apparatus to control an operation of the video game processing apparatus, the video game processing apparatus controlling progress of a video game while displaying an object on a display screen of a display device, the video game processing program product causing the video game processing apparatus to execute:
   receiving a touch operation for a plurality of touch panels, the plurality of touch panels being provided on a plurality of surfaces of a housing of the video game processing apparatus;
   determining which surface of the plurality of surfaces of the housing contains a touch panel of the plurality of touch panels from which the touch operation is received in the receiving of the touch operation; and
   carrying out a predetermined representation against the object displayed on the display screen from a side of the surface determined in the determining of which surface of the housing contains the touch panel from which the touch operation is received,
   wherein, when carrying out the predetermined representation against the object, the video game processing program product causes the video game processing apparatus to execute:
      specifying the predetermined representation according to the touch operation received in the receiving of the touch operation by referring to operation information, in which a position of the touch panel, operation content and content of each of a plurality of predetermined representations are associated with each other; and
      carrying out the specified predetermined representation.

15. A method for controlling progress of a video game while displaying an object on a display screen of a video game processing apparatus, the video game processing apparatus including a plurality of touch panels contained on a plurality of surfaces of a housing, the method comprising:
   receiving a touch operation for the plurality of touch panels;
   determining, with a processor of the video game processing apparatus, which surface of the plurality of surfaces of the housing contains a touch panel for which the touch operation is received; and
   carrying out, with the processor, a predetermined representation against the object displayed on the display screen from a side of the surface of the housing from which the touch operation is determined to be received,
   wherein the carrying out of the predetermined representation against the object includes:
      specifying the predetermined representation according to the touch operation received in the receiving of the touch operation by referring to operation information, in which a position of the touch panel, operation content and content of each of a plurality of predetermined representations are associated with each other; and
      carrying out the specified predetermined representation.

* * * * *